United States Patent [19]

Gambale et al.

[11] Patent Number: 5,280,088

[45] Date of Patent: Jan. 18, 1994

[54] THERMOPLASTIC BLENDS OF A POLYAMIDE HAVING LOW AMINE END-GROUP CONCENTRATION AND A POLYMER CONTAINING CARBONATE LINKAGES

[75] Inventors: Ronald J. Gambale, Clifton Park, N.Y.; Donald C. Clagett, Pittsfield, Mass.; Louis M. Maresca, Pittsfield, Mass.; Sheldon J. Shafer, Pittsfield, Mass.

[73] Assignee: General Electric Company, Pittsfield, Mass.

[21] Appl. No.: 539,292

[22] Filed: Jun. 14, 1990

Related U.S. Application Data

[63] Continuation of Ser. No. 434,541, Nov. 8, 1989, abandoned, which is a continuation of Ser. No. 149,991, Jan. 29, 1988, abandoned, which is a continuation of Ser. No. 834,973, Feb. 28, 1986, abandoned.

[51] Int. Cl.$^5$ .................... C08L 69/00; C08L 77/00
[52] U.S. Cl. ...................... 525/433; 525/525
[58] Field of Search .................. 525/425, 433, 434

[56] References Cited

U.S. PATENT DOCUMENTS

| | | | |
|---|---|---|---|
| 3,210,438 | 10/1965 | Chapman | 525/433 |
| 3,383,391 | 5/1968 | Carlick et al. | 260/326 |
| 3,549,601 | 8/1968 | Fowell | 528/336 |
| 3,554,944 | 1/1971 | Helm et al. | 528/336 |
| 3,684,775 | 8/1972 | Blomberg | 528/336 |
| 3,810,876 | 5/1974 | Cowell et al. | 260/78 |
| 4,066,587 | 1/1978 | Mains et al. | 260/22 D |
| 4,101,532 | 7/1978 | Ruoti et al. | 525/433 |
| 4,128,599 | 12/1978 | Thomas et al. | 525/424 |
| 4,317,891 | 3/1982 | Sakano et al. | 525/66 |
| 4,391,968 | 7/1983 | Merani et al. | 528/336 |
| 4,430,484 | 2/1984 | Quinn | 525/425 |
| 4,574,054 | 3/1986 | Ciaperoni et al. | 528/315 |

FOREIGN PATENT DOCUMENTS

| | | |
|---|---|---|
| 0188328 | 7/1986 | European Pat. Off. |
| .51054657 | 11/1974 | Japan |
| 55050061 | 10/1978 | Japan |
| 55-142049 | 4/1979 | Japan |
| 55-133446 | 10/1980 | Japan |
| 597326 | 1/1948 | United Kingdom |
| 1150715 | 4/1969 | United Kingdom |

OTHER PUBLICATIONS

Reinisch—Faserforsch Textiltech, 1970, 21(9) 367–70.
Polymer Science U.S.S.R. vol. 26 No. 3 pp. 716–722, 1984.

*Primary Examiner*—Ana L. Carrillo
*Attorney, Agent, or Firm*—Spencer D. Conard

[57] ABSTRACT

Thermoplastic blends of a polyamide having low amine end-group concentration and a polymer containing ester or carbonate linkages. The blends are useful in providing molded parts having improved properties such as improved impact strength.

2 Claims, No Drawings

THERMOPLASTIC BLENDS OF A POLYAMIDE HAVING LOW AMINE END-GROUP CONCENTRATION AND A POLYMER CONTAINING CARBONATE LINKAGES

This is a continuation of application Ser. No. 07/434,541 filed Nov. 8, 1989, now abandoned, which is a continuation of Ser. No. 07/149,991 filed on Jan. 29, 1988, now abandoned, which is a continuation of Ser. No. 834,973 filed on Feb. 28, 1986, now abandoned.

The present invention relates to thermoplastic resin blends containing polyamide and a polymer containing ester or carbonate linkages. More particularly, the present invention relates to thermoplastic resin blends containing polyamide, having controlled amine functionality, and at least one polymer having ester or carbonate linkages.

BACKGROUND OF THE INVENTION

Thermoplastic blends of polyamide with polymers containing ester or carbonate linkages are well known. Particularly, polycarbonates have been blended with polyamides to produce blends having various modified properties. Japanese Kokai No. 116541/50 discloses blends of 5–20% by weight nylon 12 and 80–90% by weight polycarbonate for use in electric insulators. Japanese Pat. Kokai No. 85420/56 discloses polyamide fibers containing 0.5%-10% by weight polycarbonate. Japanese Pat. Publn. No. 26936/76 discloses adhesive compositions containing 5–40% by weight of polycarbonate resin and 95–60% by weight polyamide resin. Japanese Pat. Kokai No. 61050/55 discloses molding compositions containing 100 weight parts poly(ester-carbonate) and 1–150 weight parts polyamide. U.S. Pat. No. 4,317,891, Sakano, et al., discloses thermoplastic blends containing polycarbonate, polyamide, and conjugated diene rubber copolymer.

Polyamide blends with polyester are also known. Japanese Pat. Kokai No. 54657/51 discloses blends of poly(ethylene-terephthalate) with polyamide. Japanese Pat. Kokai No. 113049/59 discloses blends of a polyarylate, polycarbonate, and polyamide. Japanese Pat. Kokai No. 50,061/55 discloses blends of poly(ester-carbonate) and polyamide. U.S. Pat. No. 3,989,655 discloses blends of polyester and polyamide.

The above disclosed blends are useful for their intended purpose. However, it is well known that such blends by no means live up to expectations in either the combination of physical properties present or the level of physical properties attained. Impact strength is poor. The viscosity and molecular weight of the blends is at less than expected levels. It is theorized that these blends lack the degree of chemical compatibility necessary for each resin to contribute the excellent physical properties that it may possess to the blend as a whole.

Thus, it is an object of the present invention to produce blends of polyamide with a polymer containing ester or carbonate linkages having improved impact strength, viscosity retention and molecular weight retention. It is another object of the present invention to produce blends of polyamide with a polymer containing ester or carbonate linkages having improved chemical compatibility.

DETAILED DESCRIPTION OF THE INVENTION

Briefly, according to the present invention, there are provided thermoplastic blends having unexpectedly improved properties, which blends comprise:

(a) at least one polyamide which has an amine end-group concentration of less than about 30 g-meq/kg of resin; and (b) at least one polymer containing ester or carbonate linkages.

Polymers containing ester or carbonate linkages included herein are polymer which contain at least one

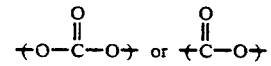

link connecting two carbon atoms in either the polymer backbone or in a graft chain. Thus, broadly, the present invention includes not only condensation polymers with which ester and carbonate linkages are readily associated, but also polyolefins with, for example, ester groups in a side or graft chain, etc. Of course, the greater in number and importance to maintaining physical properties which the ester or carbonate linkages become in a polymer, then the greater the relevance of the present invention to such polymers. Thus, preferred for use herein are polyesters, polycarbonates, and poly(ester-carbonates).

Polycarbonate resins suitable for use herein can be prepared by reacting a dihydric phenol with a carbonate precursor, such as phosgene, a haloformate or a carbonate ester. Generally speaking, such carbonate polymers may be typified as possessing recurring structural units of the formula:

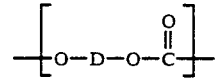

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. Pat. Nos. 4,018,750 and 4,123,436; or by transesterification processes such as are disclosed in U.S. Pat. No. 3,154,008, as well as other processes known to those skilled in the art.

Also included within the term "polycarbonate" are block copolymers having polycarbonate blocks and blocks of a second polymer, for example, polyether or polydiorganosiloxane. Poly(diorganosiloxane-polycarbonate) block copolymers are well known and described in U.S. Pat. Nos. 3,189,662; 3,819,744; 3,821,325; and 3,832,419; which are incorporated herein by reference. Poly(ether-carbonate) block copolymers are extensively described in U.S. Pat. No. 3,030,335 and J. Poly Sci., Part C, No. 4, pgs 707-730, also incorporated herein by reference.

Poly(ester-carbonate) resin usually employed may generally be described as polymers comprising recurring carbonate groups,

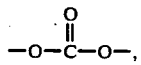

carboxylate groups,

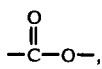

and aromatic carbocyclic groups in the linear polymer chain, in which at least some of the carboxylate groups and at least some of tee carbonate groups are bonded directly to ring carbon atoms of the aromatic carbocyclic groups. These poly(ester-carbonate) polymers in general, are prepared by reacting an aromatic difunctional carboxylic acid or ester forming derivative, a dihydric phenol and a carbonate precursor.

The preparation of poly(ester-carbonates) which may be employed in the composition of the present invention is described in U.S. Pat. Nos. 3,030,331; 3,169,121; 3,207,814; 4,194,038 and 4,156,069 incorporated herein by reference.

The poly(ester-carbonates) which are preferred in the practice of the present invention include the aromatic poly(ester-carbonates) derived from dihydric phenols, aromatic dicarboxylic acids or their reactive ester forming derivatives such as the aromatic diacid halides, and phosgene. A particularly useful class of aromatic poly(ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, the remainder of the copolymer ester units preferably comprising isophthalate units is generally from about 2 to about 90 percent, and preferably from about 5 to about 50 percent.

Polyester resin preferred for use herein may be described as polymers comprising recurring carboxylate groups in a linear polymer chain. Preferred such polyesters are usually prepared by reacting a diacid with approximately equimolar amounts of diol, or by self reacting hydroxy substituted carboxylic acids, or, where existent, their cyclic ester derivatives.

Hydroxy substituted carboxylic acids may be exemplified by para-hydroxybenzoic acid or by lactones having from 4 to 12 carbons in the cyclic chain. Included in the lactones are gamma-butyrolactone, delta-valerolactone, epsilon-caprolactone, etc. Of course, the polyester may be exclusively a polylactone, or the lactone may be a copolymer with diacids and diols.

Preferred polyesters are polymerized from diacids and diols. The diacid may be an aliphatic difunctional carboxylic acid, but is preferably an aromatic difunctional carboxylic acid. The diols may be aliphatic diols, cycloaliphatic diols, or dihydric phenols. Exemplary aliphatic difunctional carboxylic acids are sebacic acid, adipic acid, fumaric acid, succinic acid, etc. Exemplary diols include ethylene glycol, propylene glycol, butylene glycol, 1,6-hexaneiiol, neopentyl glycol, etc. as aliphatic diols, and 1,4-cyclohexanedimethanol as cycloaliphatic diols. Aromatic difunctional carboxylic acids and dihydric phenols are further described below.

Especially preferred polyesters for use herein include the polyarylates, which are polymerized from an aromatic difunctional carboxylic acid, and a dihydric phenol; the poly(alkylene terephthalates), which include poly(ethylene terephthalate) and poly(butylene terephthalate); and the poly(cycloalkylene terephthalates), including poly(1,4-cyclohexanedimethanol terephthalate) and copolymers thereof containing ethylene glycol. The polymerization of these polymers is not critical to the present invention and is well known to persons skilled in the art.

Typical dihydric phenols useful in formulating the polycarbonate, poly(ester-carbonate), or polyester as described above may be represented by the general formula:

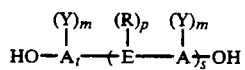

I in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, and generally from one to twelve carbon atoms, inclusive, etc. Where E is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms, inclusive, such as cyclohexylidene; a direct bond; a sulfur-containing linkage, such as sulfide, sulfoxide or sulfone; an ether linkage; a carbonyl group; a tertiary nitrogen group; or a silicon-containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.); aryl (phenyl, naphthyl, etc.); aralkyl (benzyl, ethylphenyl, etc.); or cycloaliphatic of five to seven carbon atoms, inclusive (cyclopentyl, cyclohexyl, etc.). Y may be an inorganic atom such as chlorine, bromine, fluorine, etc; an orqanic group such as the nitro group, etc.; an organic group such as R above; or an oxy group such as OR, it being only necessary that Y be inert to and unaffected by the reactants and the reaction conditions. The letter s is any whole number from and including zero to twenty; m is any whole number from and including zero through the number of positions on A available for substitution; p is any whole number from and including zero through the number of available positions on E; and t is a whole number equal to at least one.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like. Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxynaphthalenes such as 2,6-dihydroxynaphthalene, etc.

Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; bis-(3,5-dimethyl-4-hydroxyphenyl) sulfone; 5'-chloro-2,4'-dihydroxydiphenyl sulfone; 3-chloro-bis-(4-hydroxyphenyl) sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals, etc., are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-diohlorodinaphthyl-2,2'-ether; 4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included. Other dihydric phenols which are suitable for the preparation of the above described polymers are disclose in U.S. Pat. Nos. 2,999,835; 3,028,365; 3,334,154; 4,131,575.

In general, any aromatic difunctional carboxylic acid or its reactive derivative, such as acid halide, conventionally used in the preparation of polyesters, may be used for the preparation of the poly(estercarbonates) or polyesters described above. The difunctional aromatic carboxylic acids which may be used include the aliphatic-aromatic carboxylic acids, in addition to the wholly aromatic carboxylic acids. Of course, skilled practitioners will recognize that some small percentage by number of the difunctional carboxylic acid may be difunctional aliphatic carboxylic acid. However, the use of such aliphatic carboxylic acids should not be to such a degree that desirable characteristics associated with aromatic carboxylic acids are substantially reduced. The aromatic dicarboxylic acids or their reactive derivatives, such as the aromatic diacid halides, produce poly(ester-carbonate) and polyarylate which are most useful from the standpoint of physical properties.

The aromatic difunctional carboxylic acids may be represented by the general formula:

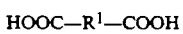

$$HOOC-R^1-COOH \qquad \text{II}$$

wherein $R^1$ represents an aromatic radical such a phenylene, naphthylene, biphenylene, substituted phenylene, etc.; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, $R^1$ is an aromatic radical such as phenylene, biphenylene, naphthylene, substituted phenylene, etc. Some nonlimiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acids, and isomeric naphthalene dicarboxylic acids. The aromatics may be substituted with Y groups in the same manner as the Formula I aromatics are substituted. Of course, these acids may be used individually or as mixtures of two or more different acids.

The carbonate precursor used above to produce the polycarbonate or poly(ester-carbonate) resins may be either a carbonyl halide, a carbonate ester, or a haloformate. The carbonyl halides which can be employed herein are carbonyl chlorides and carbonyl bromides.

Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc., or glycols such as bis-haloformates of ethylene glycol, neopentyl glycol, polyethylene glycol, etc. While other carbonate precursors will occur to those skilled in the art, carbonyl chloride, also know as phosgene, is preferred.

Polyamides suitable for the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative or equivalent thereof, for example, an ester or acid chloride. Herein, where a carboxylic acid, ester, or acid chloride is referred to, those skilled in the art will readily recognize circumstances where the functional equivalent is preferred, i.e., where a dicarboxylic acid is described, the diphenyl ester or acid chloride may be appropriate, or where a mono-ester is described, the carboxylic acid or acid chloride may be appropriate. The term "substantially equimolecular" proportions (of the diamine and of the dicarboxylic acid) is used to cover both strict equimolecular proportions and slight departures therefrom which ar involved in conventional techniques for stabilizing the viscosity of the resultant polyamides.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned: aminocaproic acid, butyrolactam, pivalolactam, caprolactam, capyyllactam, enantholactam, undecanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, those represented by the general formula:

$$H_2N(CH_2)_nNH_2$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, para-phenylene diamine, meta-xylene diamine, para-xylene diamine and the like.

The dicarboxylic acids may be aromatic, for example as described in Formula II above, or aliphatic dicarboxylic acids of the formula:

HOOC—Z—COOH wherein Z represents a divalent aliphatic group containing at least 2 carbon atoms. Examples of such acids are sebacic acid, octadecanedoic acid, suberic acid, glutaric acid, pimelic acid and adipic acid.

The polyamide of the blend may be either crystalline, amorphous, or of mixed phase, but preferably, amorphous. Typical examples of the polyamides, or nylons, as these are often called, include for example, polyamides 6, 6/6, 11, 12, 6/3, 6/4, 6/10 and 6/12; polyamides resulting from terephthalic acid and/or isophthalic acid and trimethyl hexamethylene diamine; polyamides resulting from adipic acid and meta xylylenediamines; polyamides resulting from adipic acid, azelaic acid and 2,2-bis-(p-aminocyclohexyl)propane; and polyamides resulting from terephthalic acid and 4,4'-diamino-dicyclohexylmethane. Mixtures and/or copolymers of two or more of the foregoing polyamides or prepolymers thereof, respectively, are also within the scope of the present invention.

It is critical to the present invention that the polyamides, as generally described above, have an amine end-group concentration sufficiently low that in blends with carbonate or ester link containing polymers, viscosity and molecular weight of the carbonate or ester link containing polymers, and impact strength of the blend, are substantially unaffected by degradation, i.e. viscosity and $\overline{M}_w$ not reduced by more than 20%, and notched izod impact strength greater than 1.0 ft-lb/in. Generally, a sufficiently low amine end-group concentration is in the order of less than about 30 g-meq/kg and preferably less than about 10 g-meq/kg. Polyamides with such low amine end-group concentrations may be obtained by end-capping amine groups on base polyamides to control the concentration, or by polymerizing the polyamide under appropiate conditions to reduce the inherent amine end-group concentration of the base polymer.

The amine end-group concentration of a polymerized base polyamide may be controlled by any of several amine end-capping reactions with an end-capping compound. One such end-capping reaction is an amidization reaction which combines the terminal amine group with, for example, an anhydride, $R^2(C=O)O(C=O)R^2$, to form an amide link; with an acid chloride, $R^2(C=O)Cl$, to form an amide link; with a carboxylic acid $R^2(C=O)OH$, to form an amide link; with a carboxylic acid ester, $R^2(C=O)OR^2$, to form an amide link; with an amide, $R^2(C=O)NR^2R^2$, to form an amide link; with a carbonate, $R^2O(C=O)OR^2$, to form a urethane link; with a isocyanate, $R^2—N=C=O$, to form a urea link; and with a carbodiimide, $R^2—N=C=N—R^2$, to form a guanidine link, wherein $R^2$ is a saturated or unsaturated aliphatic or aromatic hydrocarbon. Obviously, each of the above reactions will replace the amine end-group with an —$R^2$ end-group attached to the polyamide through the indicated link.

Other reactions may be used to replace the end-group. An iminization reaction combines the amine end-group, for example, with an aldehyde, $R^2CHO$, to form an imine link or with an acetal $R^2CH(OR^2)_2$ to form an imine link, wherein $R^2$ is the same as above, and also includes hydrogen in this instance. An amination reaction combines the amine end-group, for instance, with an olefin, $R^3$—CH=CH—$R^3$, to form a substituted amine, wherein $R^3$ is $R^2$, —(C=O)$R^2$, —(C=O)$OR^2$, —(C=O)OH, —CHO, —(C=O)$NR^2R^2$, and $R^2$ is given above.

An imidization reaction combines the amine end-group with a cyclic anhydride to form an imide. The cyclic anhydride may have the formula:

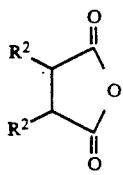

wherein $R^2$ is given above, but may also be hydrogen or join to form a cycloaliphatic. Such cyclic anhydrides will react with the amine end-group to form a succinimide. The cyclic anhydride may also have the formula:

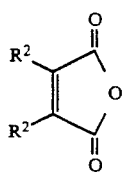

wherein $R^2$ is given above, but may also be hydrogen or join to form a cycloaliphatic. These cyclic anhydrides will react with the terminal amine end-group to form a maleimide. Still other examples of a cyclic anhydride have the general formula:

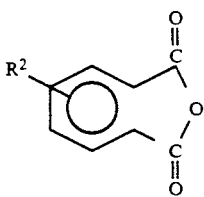

wherein $R^2$ is given above, but may also be hydrogen. These cyclic anhydrides will react with the amine end-group to form a phthalimide.

Specific and representative end-capping compounds include for the anhydrides benzoic anhydride and acetic anhydride; for the acid chlorides, benzoyl chloride and acetic chloride; for the carboxylic acids, benzoic acid and acetic acid; for the carboxylic acid esters, phenyl benzoate; for the amides, N,N-dimethyl acetamide; for the carbonates, diphenyl carbonate; for the isocyanates, phenyl isocyanate; and for the carbodiimides, diphenyl carbodiimide. Additional representative end-capping compounds include, for the aldehydes, benzaldehyde; for the acetals, dimethoxy methane; for the olefins, stilbene; for the saturated cyclic anhydrides, succinic anhydride; for the unsaturated cyclic anhydrides, maleic anhydride; and for the aromatic cyclic anhydrides, phthalic anhydride.

The above mentioned reactions are commonly associated with amines and are ones which amines will readily undergo. Thus, the end-capping compounds mentioned in association with each reaction will generally react quite easily with the amine end-group and lower the amine end-group concentration of the polyamide.

The above list of reactions and compounds is not exhaustive, for example, the amine end-group may be reacted with epoxides to produce a more highly substituted and less reactive amine. Persons skilled in the art can easily imagine other amine end-capping reactions, the only objective being to lower the amine end-group concentration of the polyamide.

The amine end-capping reaction can be carried out simply, by melt extruding the polyamide with the end-capping compound, even in the presence of a second or third thermoplastic polymer. The proper conditions for any given reaction, including temperature and proper amount of amine end-capping compound can easily be determined by persons skilled in the art. Obviously, the temperature must be high enough to melt the resin and encourage the reaction, but not so high as to degrade the polymer. In general, and particularly in the case of the cyclic anhydrides, it has been found that at least 1 equivalent and preferably 2 equivalents of end-capping compound to amine end-group functions should be added to reduce amine end-group concentration.

Inherent amine end-group concentration of a base polyamide may be controlled during polymerization by controlling the ratio of reactive amine or derivative thereof to reactive carboxylic acid or derivative thereof. For example, the amine end-group concentration of a polyamide may be lowered, by attaining higher molecular weights, by polymerizing a polyamide from an excess of diacid monomer over diamine monomer, by inserting in the polymerization a mono-amino or mono-carboxylic acid moiety to prevent or cap a terminal amino functionality, or by a combination of these methods. Of course, it is readily apparent that too high a ratio of diacid to diamine or too great a concentration of mono-amine or mono-carboxylic acid will drastically reduce molecular weight of the polyamide. Mono-amine compounds should be utilized in conjunction with an excess of dicarboxylic acid over diamine and mono-carboxylic acid compounds should be utilized with an excess or equal amounts of diamine over dicarboxylic acid or with a mono-amino/monocarboxylic acid compound or lactam. Those skilled in the art are capable of determining proper ratios of monomers to reduce amine end-group concentration while preserving molecular weight.

Suitable mono-amino compounds include aliphatic mono-amines, cycloaliphatic mono-amines and aralkyl mono-amines. Depending upon the method of polymerization, such mono-amines must have appropriate molecular weights to prevent vaporization. Preferred mono-amines are dodecyl amine, decyl amine, tetradecyl amine, benzyl amine, and aminomethylene cyclohexane.

Suitable mono-carboxylic acid compounds or derivatives thereof include aliphatic carboxylic acids, cycloaliphatic carboxylic acids, and aromatic carboxylic acids or the corresponding acid chloride or ester derivatives. The molecular weight of mono-carboxylic acids must be controlled similarly to the mono-amines to prevent vaporization during polymerization. Preferred mono-carboxylic acids include phenyl benzoate, phenyl naphthalate, and phenyl stearate.

The above polyamides may be polymerized by any of several well known processes. Salt polymerization reacts an amine group and a carboxylic acid group to form an amide group with the concomitant elimination of water. Oligomeric salts are formed, water is removed, and polymerization proceeds at higher temperature. Other processes include solution or interfacial polymerization. These processes are recommended to react an amine and an acid chloride to form a polyamide with the loss of acid. A preferred process is melt polymerization, by amine-ester interchange. A solvent may be added, or the process may be performed without a solvent as described in U.S. Pat. No. 4,567,249, hereby incorporated by reference.

Suitable polyamides for use herein have a number average molecular weight ranging from about 12,000 to about 60,000 g/mole, preferably from about 15,000 to about 40,000 g/mole, and most preferably from about 20,000 to about 35,000 g/m, as determined by membrane osmometry; J. Herold, G. Meyerhoff, Evr. Polym. J. 15,525 (1979). Alternately, preferred polyamides may be described as having an intrinsic viscosity ranging from about 0.5 to about 1.6 dl/g, preferably from about 0.7 to about 1.4 dl/g, and most preferably from about 0.9 to about 1.2 dl/g as measured with 40 mg per 10 cc of a 60/40 weight ratio phenol/tetrachloroethylene solvent at 30° C.

It is also to be understood that the use of the term "polyamides" herein and in the appended claims is intended to include the toughened or super tough polyamides. Super tough polyamides, or super tough nylons, as they are more commonly known, are available commercially, e.g. from E.I. DuPont under the tradename Zytel ST, or may be prepared in accordance with a number of U.S. Patents including, among others, Epstein—U.S. Pat No. 4,174,358; Novak—U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. Patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

Thermoplastic blends of polyamide with polycarbonate, poly(ester-carbonate) and/or polyester in any proportion will at least in some degree benefit from the present invention. However, as a practical matter, the benefits to such thermoplastic blends will not be measurably significant unless in each 100 weight parts thermoplastic resin there are at least 1 and preferably 10 weight parts polyamide and at least 1 and preferably 10 weight parts polycarbonate, poly(ester-carbonate) and/or polyester.

Of course, in addition to other common and suitable thermoplastic resins, the thermoplastic blends herein may contain various impact modifiers, stabilizers, flame retardants, mold release agents, reinforcing agents, pigments, and the like. Many additives are widely used and recognized as suitable for use herein.

The thermoplastic blends of the present invention are simply prepared by standard techniques; for example, by simple melt blending or dry mixing and melt extruding at an elevated temperature. The extruded admixture is then molded into a piece of specific dimensions or further extruded into a film or sheet product.

DESCRIPTION OF SPECIFIC EMBODIMENTS

Further illustration of this invention is set forth in the following examples. There is no intention to limit the scope of the invention to merely what is shown.

TESTS (A) Determination of Amine End-Group Concentration

A Nylon sample (approximately. 20 g) was finely ground in a Thomas-Wiley mill, then dried in vacuum oven at 60° C. and 25 in Hg for 40 minutes. After cooling in a vacuum-sealed desiccator for 1 hour, two 7 g samples were weighed out in two 250 mL Erlenmeyer flasks to the nearest 0.1 mg. and within 20 mg. of each other. The flasks were stoppered whenever possible. To each flask (A and B) was added 125.0 mL of a 68% phenol in methanol solution, and to a third flask was added the same volume as a blank. All three flasks were fitted with 30 cm condensers and heated to reflux on hot plates with magnetic stirring. In general, it required 15 minutes for total polymer dissolution, upon which the solutions were refluxed an additional 45 minutes. After being removed from the heat, the flasks were cooled to room temperature over a period of 1 hour in water baths. Subsequently, the condensers were removed and to each flask was added 0.40 mL of an indicator solution consisting of equal volumes of 1% aq. xylene cyanole and 1% aq. methyl orange. With a 10.00 mL burette, flask A was titrated with 0.0500M HCl to the first persistent faint pink color, and the volume was recorded. To this flask was added 5.0 mL of a buffer solution consisting of 101.2 mL of 1.00M HCl and 10.0 mL pyridine. Flask B was titrated to the same color as flask A, and this volume was recorded as the actual measurement. The blank flask was titrated similarly. In some cases, addition of the indicator solution to the blank resulted in a purple color (past end-point), therefore it was back-titrated with 0.0474M NaOH. The corrected amine end-group concentration (AEG concentration) was calculated as follows:

$$AEG = \frac{(\text{vol flask } B \times \text{conc HCl} - \text{vol. blank} \times \text{conc titrant}) \times 1000}{\text{weight Nylon flask } B} = \text{gram} -$$

milliequivalents/kg (g − meq/kg)

(B) Chloroform Extraction and Molecular Weight Determination

The finely ground blended polyamide/polycarbonate was weighed and placed in a soxhlet thimble, then was continuously extracted with 150 mL of refluxing chloroform with the aid of an extraction chamber fitted with the reflux condenser and mounted onto a 250 mL round-bottom flask containing the chloroform over 15 hours (overnight). The solution was evaporated in vacuo and further dried under high vacuum overnight to remove moisture and residual solvent for accurate weighing. A small solid sample (7 mg) was dissolved in 3 mL of a 0.5% ethanol in chloroform solution and subjected to GPC analysis (Waters Assoc., ultrastyrogel 500A°, $10^3$A°, $10^4$A° and $10^5$A° columns, 0.5% ethanol in chloroform eluent, relative to polystyrene molecular weight standards) to evaluate the extent of polycarbonate degradation. The residual material in the soxhlet thimble (residual polyamide) was dried in a vacuum oven at 60° C. and 30 in Hg overnight, then transferred to a desiccator to cool to room temperature for accurate weighing.

EXAMPLES 1-5

The raw materials (Table 1) are charged into a 4CV Atlantic Research helicone reactor at room temperature and atmospheric pressure under a nitrogen blanket. The reactor is sealed and pressurized to 2 lb/sq-in with nitrogen. The mixture is then stirred and heated to 180° C. over a period of 45 minutes. The mixture continues to stir at 180° C. under nitrogen pressure for an additional 30 minutes. The reaction temperature is raised to 200° C. over a period of 15 minutes. The mixture is held at 200° C. for an additional 30 minutes. The pressure is reduced to atmospheric with a nitrogen sweep. The reaction temperature is raised to 225° C. over a period of 15 minutes. Vacuum is then applied in 5 inch (mercury) increments at 5 minute intervals until 20 inches (mercury) is reached. The mixture is stirred under vacuum for an additional 15 minutes. During this time the mixture temperature is increased to 240°-245° C. Additional vacuum is then applied to reach full vacuum (0.4-3 mm mercury). Concurrently, the mixture temperature is raised to 265° C. The mixture continues to stir under the foregoing conditions for 5 to 30 minutes dependent on raw materials and their relative proportions. At this time the mixture has been converted to a viscous, high polymeric resin. The reactor is now brought to atmospheric pressure by the application of nitrogen gas. The bottom valve of the reactor is opened and the resin is extruded into a water bath. All of the examples produced (1-5) are poly(hexamethyleneisophthalamide) resins (nylon 6,I) with varied free amine levels, Table 2. They are all amorphous and possess Tg's in the vicinity of 123° C.

TABLE 1

| Example | DPI[1] (g-mole) | HMDA[2] (g-mole) | DDA[3] (g-mole) |
|---|---|---|---|
| 1 | 3.000 | 2.992 | 0.038 |
| 2 | 3.000 | 3.000 | 0.038 |
| 3 | 3.000 | 3.030 | none |
| 4 | 3.000 | 3.030 | 0.038 |
| 5 | 3.000 | 3.060 | none |

[1]Diphenyl Isophthalate, Quality Chemicals Co., 99+% purity
[2]Hexamethylene Diamine, Aldrich Chemical Co., 98% purity
[3]Dodecylamine, Aldrich Chemical Co., 98% purity

TABLE 2

| Example | i.v.[4] (dl/g) | Amine End-Group Concentration (g-meq/kg) |
|---|---|---|
| 1 | 0.99 | 4 |
| 2 | 1.01 | 16 |
| 3 | 1.23 | 38 |
| 4 | 0.87 | 83 |
| 5 | 0.94 | 136 |

[4]60/40 pbw phenol/symmetrical tetrachloroethane at 30° C.

EXAMPLES 6-10

The resins synthesized as Examples 1-5 were used to produce polycarbonate/nylon resin blends having a weight ratio of 75/25. Prior to blending, the nylon and polycarbonate resin components were dried in a circulating, forced hot air oven at 110° C. for 10 and 4 hours, respectively. Blends were prepared by dry mixing the components and then melt processing them through a Warner Pfleiderer ZSK-30 twin screw extruder at 270° C. After drying the resulting pellets in the above noted oven at 110° C. for 10 hours, the resin blends were injection molded into ASTM test specimen on a 75 Ton Newburg screw injection molding machine under the conditions shown on Table 3. Property profiles for Examples 6-10 are shown on Table 4.

TABLE 3

| | Example | | | | |
|---|---|---|---|---|---|
| | 6 | 7 | 8 | 9 | 10 |
| Cylinder Temperature (° C.) | | | | | |
| Rear | 275 | 275 | 275 | 275 | 275 |
| Middle | 275 | 275 | 275 | 275 | 275 |
| Nozzel | 275 | 275 | 275 | 275 | 275 |
| Mold Temperature (°C.) | 65 | 65 | 65 | 65 | 65 |
| Injection Pressure (psi) | 1500 | 1500 | 1500 | 1500 | 1500 |
| Cycle Time (sec) | 20 | 20 | 20 | 20 | 20 |

TABLE 4

| | Example | | | | |
|---|---|---|---|---|---|
| | 6 | 7 | 8 | 9 | 10 |
| Composition (pbw)[5] | | | | | |
| Polycarbonate Resin[6] | 75 | 75 | 75 | 75 | 75 |
| Nylon 6, I Resin | 25(1) | 25(2) | 25(3) | 25(4) | 25(5) |
| Tensile Strength (psi) | | | | | |
| Yield | 10800 | 10700 | 10700 | 10500 | No Yield |
| Break | 8600 | 9300 | 8300 | 8300 | 9800 |
| Elongation (%) | | | | | |
| Yield | 6.3 | 6.1 | 6.0 | 5.6 | No Yield |
| Break | 9.5 | 68.6 | 11.0 | 34.5 | 5.1 |
| IZOD Impact (ft-lb/in) | | | | | |
| Unnotched | 39.64 | 39.64 | 37.40 | 34.99 | 13.48 |
| Notched | 1.59 | 1.30 | 0.70 | 0.51 | 0.33 |

[5]The number in parentheses ( ) indicates the nylon resin used to make the resin blends.
[6]Poly(bisphenol-A carbonate) resin, i.v. = 0.595-0.640 dl/g in methylene chloride at 25° C., General Electric Company

EXAMPLES 11-15

Polyamide resin, shown in Table 5, was finely ground in a Thomas-Wiley mill, dried in a vacuum oven at 60° C. and 25 in Hg for 40 minutes, then transferred to a desiccator to cool and dry over 1 hour. Thus treated, the resin was mixed with phthalic anhydride in the indicated proportions of Examples 12-15, then tumble mixed for 1 hour. Untreated resin was retained as a control in Example 11. Approximately 1.75 g of mixed polyamide resin was placed in a 15 mm×15 cm pyrex test tube and placed under a mechanically rotating stainless steel rod. The bottom of the test tube was heated at 250° C. for 8 minutes, it generally required the aid of a metal spatula to contain the material in the heated zone. While still hot, it was removed from the heat and rod, the polymer adhering to the rod was frozen in liquid nitrogen and cracked off with cutting pliers. The polymer adhering to the test tube was frozen similarly, the tube was broken and the polymer fragments separated and collected. The recovered chips were broken up further under liquid nitrogen, then finely ground in a Thomas-Wiley mill.

The mixed polyamide resin of each of Examples 12–15 and Example 11 were tested for amine end-group concentration, the results of which test are shown in Table 5.

TABLE 5

| Example | Polyamide[7] (Weight %) | Phthalic Anhydride (Weight %) | Amine end-group Concentration (g-meq/kg) |
|---|---|---|---|
| 11[8] | 100 | — | 46.7 |
| 12 | 100 | 0 | 37.2 |
| 13 | 99.31 | 0.69[15] | 12.4 |
| 14 | 98.63 | 1.37 | 6.3 |
| 15 | 97.97 | 2.03 | 6.1 |

[7]Nylon 6, CAPRON 8200 Resin, Allied Chemical Corporation
[8]Untreated
[15]1 equivalent, anhydride functions/amine end-group functions

EXAMPLES 16–18

Polyamide resin and polycarbonate resin, as identified in Table 6 were finely ground in a Thomas-Wiley mill, dried in a vacuum oven at 60° C. and 25 in Hg for 40 minutes, then transferred to a desiccator to cool and dry over 1 hour. The resins were dry mixed in the proportions of Table 6, tumble mixed for 1 hour, and heated to 250° C. in a manner identical to Examples 12–15. The recovered resin blend was finely ground and chloroform extracted according to the aforementioned procedure. The chloroform solutions were analyzed by gel permeation chromotography to find the polycarbonate molecular weight as shown in Table 6.

TABLE 6

| Example | Polyamide/ Polycarbonate[9] (Weight Ratio) | Polyamide AEG (g-meq/kg) | $\overline{M}_w$ ($\times 10^3$ g/m) | $\overline{M}_n$ ($\times 10^3$ g/m) | Recovered Polycarbonate (Weight %) | Recovered Polyamide (Weight %) |
|---|---|---|---|---|---|---|
| 16 | 1/1 | 6.3[10] | 46.96 | 18.4 | 107 | 104 |
| 17 | 2/3 | 6.3[10] | 42.7 | 15.08 | 97 | 122 |
| 18 | 1/1 | 46.7[11] | 32.65 | 13.49 | 95 | 112 |

[9]LEXAN ® 145 Resin, $\overline{M}_w$ = 48,000–50,000 g/m, $\overline{M}_m$ = 19,000–20,000 g/m, General Electric Company
[10]Polyamide of Example 14
[11]Polyamide of Example 11

EXAMPLES 19–22

Polyamide was dried in an air-circulating oven at 100° C. for 3 hours and phthalic anhydride was dried in a desiccator overnight under vacuum seal. Untreated polyamide was retained as control Example 19. The dried materials were mixed in the proportions of Table 7, Examples 20–22 and tumble-mixed for 1 hour. The mixed polyamide resin was extruded in a Haake Twin-Screw TW-100 instrument, the operating zones of which were at the following temperatures: Zone 1, 200° C.; Zone 2, 250° C.; Zone 3, 250° C.; die, 250° C. The screws were operating at a speed of 150 rpm, and the material was mechanically fed in at a constant rate. The extrudate was quenched in water, air-dried and pelletized. Amine end-group concentration was determined for the extrudate and shown in Table 7.

TABLE 7

| Example | Polyamide[12] (Weight %) | Phthalic Anhydride (Weight %) | Amine end-group Concentration (g-meq/kg) |
|---|---|---|---|
| 19 | 100 | — | 46.7 |
| 20 | 100 | 0 | 46.0 |
| 21 | 99.31 | 0.69 | 19.2 |
| 22 | 98.63 | 1.37 | 14.4 |

[12]Nylon 6, CAPRON 8200 Resin, Allied Chemical Corporation

EXAMPLES 23–28

Polyamide and polycarbonate were dried in an air-circulating oven at 100° C. for 3 hours and phthalic anhydride was dried in a desiccator overnight under vacuum seal. The dried materials were mixed in the proportions of Table 8, and tumble-mixed for 1 hour. The mixed resins were extruded according to the conditions of Examples 20–22. The extrudate was finely ground and chloroform extracted according to the above procedure. The chloroform solutions were analyzed by gel permeation chromotography to find the polycarbonate molecular weight as shown in Table 8.

TABLE 8

| Example | Polyamide/ Polycarbonate[12] (Weight Ratio) | Polyamide AEG (g/meq/kg) | Phthalic Anhydride (g/100 g Polyamide) | $\overline{M}_w$ ($\times 10^3$ g/m) | $\overline{M}_n$ ($\times 10^3$ g/m) | Recovered Polycarbonate (Weight %) | Recovered Polyamide (Weight %) |
|---|---|---|---|---|---|---|---|
| 23 | 1/1 | 46.7[13] | NA | 22.6 | 8.2 | 105 | 103 |
| 24 | 1/1 | 6.3[14] | NA | 46.25 | 7.2 | 62 | 149 |
| 25 | 2/3 | 6.3[14] | NA | 50.0 | 30.2 | 96 | 119 |
| 26 | 1/3 | 6.3[14] | NA | 51.3 | 15.3 | 90 | 156 |
| 27 | 1/9 | 6.3[14] | NA | 51.1 | 15.1 | 97 | 123 |
| 28 | 1/1 | 46.7[13] | 1.38 | 44.4 | 4.8 | 85 | 127 |

[12]LEXAN 145 Resin, $\overline{M}_w$ = 48,000–50,000 g/m, $\overline{M}_n$ = 19,000–20,000 g/m, General Electric Company
[13]Polyamide of Example 11
[14]Polyamide of Example 14

What is claimed is:

1. A thermoplastic blend derived from:
   (a) polycarbonate resin; and
   (b) polyamide resin having an amine end-group concentration of less than 10 g-meq/kg of polyamide resin, wherein in each 100 weight parts total thermoplastic resin there are at least 1 weight part said polyamide and at least 1 weight part polycarbonate resin.

2. The blend of claim 1 wherein in each 100 weight parts thermoplastic resin there are at least 10 weight parts said polyamide and at least 10 weight parts polycarbonate resin.

* * * * *